(12) United States Patent
Geibel

(10) Patent No.: US 6,924,438 B2
(45) Date of Patent: Aug. 2, 2005

(54) EPOXY SIGHT BOWLS FOR USE IN POWER TRANSFORMERS

(75) Inventor: David M. Geibel, Jackson, TN (US)

(73) Assignee: ABB Inc., Norwalk, CT (US)

( * ) Notice: Subject to any disclaimer, the term of this patent is extended or adjusted under 35 U.S.C. 154(b) by 0 days.

(21) Appl. No.: 10/643,035

(22) Filed: Aug. 18, 2003

(65) Prior Publication Data

US 2004/0052994 A1 Mar. 18, 2004

Related U.S. Application Data

(63) Continuation of application No. 09/483,786, filed on Jan. 14, 2000, now abandoned.

(51) Int. Cl.$^7$ ................................................ H01B 17/06
(52) U.S. Cl. ...................................... 174/152 R; 336/5
(58) Field of Search ........................... 336/5; 174/152 R

(56) References Cited

U.S. PATENT DOCUMENTS

| | | | | |
|---|---|---|---|---|
| 3,635,544 A | 1/1972 | Stamm et al. | ............... | 350/160 |
| 3,650,355 A | 3/1972 | Boswell | ....................... | 184/59 |
| 3,716,489 A | 2/1973 | DeLapp | ....................... | 252/300 |
| 4,101,459 A | 7/1978 | Andrews | ................ | 260/18 EP |
| 4,178,274 A | 12/1979 | Denk et al. | ............. | 260/31.8 E |
| 4,214,119 A | 7/1980 | Keen, Jr. | ...................... | 174/31 |
| 4,365,052 A | 12/1982 | Reeh et al. | .................... | 528/92 |
| 4,543,730 A | * 10/1985 | Scott | ............................. | 73/305 |
| 4,594,475 A | * 6/1986 | Bowman et al. | ......... | 174/152 R |
| 4,645,818 A | 2/1987 | Andrews | ...................... | 528/93 |
| 4,845,162 A | 7/1989 | Schmitt et al. | .............. | 525/423 |
| 4,894,431 A | 1/1990 | Armbruster et al. | ........... | 528/90 |
| 5,106,947 A | 4/1992 | Maurer et al. | ............... | 528/361 |
| 5,492,981 A | 2/1996 | Hoehn et al. | ................ | 525/476 |
| 5,505,895 A | 4/1996 | Bull et al. | ................... | 264/327 |
| 5,552,459 A | 9/1996 | Baumann et al. | ............ | 523/427 |
| 5,585,414 A | 12/1996 | Klemarczyk et al. | .......... | 522/13 |
| 5,599,651 A | 2/1997 | Steinmann et al. | ....... | 430/280.1 |
| 5,612,445 A | 3/1997 | Jones | ....................... | 528/295.5 |
| 5,679,719 A | 10/1997 | Klemarczyk et al. | .......... | 522/13 |
| 5,863,970 A | 1/1999 | Ghoshal et al. | .............. | 523/434 |
| 5,883,214 A | 3/1999 | Wipfelder et al. | ............. | 528/17 |
| 6,074,595 A | * 6/2000 | Eisberg et al. | ............... | 264/496 |

* cited by examiner

Primary Examiner—Anh Mai
(74) Attorney, Agent, or Firm—Woodcock Washburn LLP

(57) ABSTRACT

A cured filler-less epoxy compound formed as a rigid, three-dimensional, transparent structure, including a cylindrical sight bowl of a utility or industrial high voltage bushing. A process for making a three-dimensional (e.g., cylindrical), transparent structure with improved strength, including the steps of obtaining a cured filler-less epoxy compound and then pre-stressing the filler-less epoxy compound.

10 Claims, 4 Drawing Sheets

Obtain a cured filler-less epoxy compound

Heat the cured filler-less epoxy compound at 125 degrees Centigrade under a pressure of about 2,500 psi for 12 hours

EPOXY SIGHT BOWLS FOR USE IN POWER TRANSFORMERS

CROSS-REFERENCE TO RELATED APPLICATION

This application is a continuation of U.S. application Ser. No. 09/483,786 filed Jan. 14, 2000 now abandon. The disclosure of the foregoing application is hereby incorporated by reference, in its entirety.

FIELD OF THE INVENTION

This invention generally relates to transparent materials made of filler-less epoxy. More particularly, the invention relates to materials made of filler-less cycloaliphatic epoxy which, when pre-stressed, obtain certain improved properties and characteristics.

BACKGROUND OF THE INVENTION

Epoxy resins are known for their excellent chemical and thermal resistance, good electrical and mechanical properties and for their adhesion to a wide variety of substrates. Because of this, epoxy resins are presently used in many industrial applications.

When exposed to stress conditions, including heat and pressure, polymers derived from epoxy resins generally exhibit poor structural characteristics. Such polymers are generally brittle and when exposed to stress conditions, the polymer is highly susceptible to shrinking and cracking. To combat this problem, epoxy resins are generally utilized in combination with "fillers," which can be made from a number of materials including particulate silica, ground quartz, alumina and aluminum hydride. This results in a more stable product that is less brittle and less susceptible to shrinkage and cracking. But with the addition of filler materials to the epoxy resins comes one drawback—what once may have been a transparent epoxy resin material may now be a non-transparent polymer with improved characteristics.

While non-transparent epoxy materials are useful in many instances, glass is still the major material used in the case where transparency is required. For example, bushings in utility and industrial transformers currently utilize a glass sight bowl to provide a three hundred and sixty degree view of the oil level in the bushing. Because of the extreme conditions in an operating bushing, including excessive heat and pressure, high strength glass is currently the only available material to provide the requisite electrical insulation and mechanical support while simultaneously providing a visible view of the oil level.

Thus, an epoxy material that can be produced with improved strength and stability characteristics, while remaining transparent, could have numerous practical industrial applications including, but not limited to, replacing presently-used glass sight bowls in utility and industrial high voltage bushings.

SUMMARY OF THE INVENTION

The present invention provides epoxy compounds that are transparent and exhibit improved strength and stability characteristics. One presently preferred embodiment of the invention includes a cylindrical sight bowl of a utility or industrial high voltage bushing.

Another aspect of the present invention relates to a process for making a three-dimensional (e.g., cylindrical), transparent structure with improved strength. One presently preferred method includes steps of obtaining a cured filler-less epoxy compound and then pre-stressing the filler-less epoxy compound. These and other aspects of the present invention are disclosed below.

BRIEF DESCRIPTION OF THE DRAWINGS

The above-mentioned and other features and advantages of the invention will be apparent to those of ordinary skill in the art from the following detailed description of which.

DETAILED DESCRIPTION OF THE INVENTION

As previously discussed, an epoxy material that can be made transparent, yet still remain structurally strong, can have numerous practical applications. Accordingly, an embodiment of the present invention includes a rigid, three-dimensional, transparent sight bowl 10 comprising a cured filler-less epoxy compound. Numerous shapes and sizes are intended to be included where a strong and durable transparent structure is needed. Current structures utilizing high strength glass, and their corresponding shapes, are particularly relevant as high strength glass is the currently utilized material where transparency and superior structural stability are needed.

It is preferred that the structure of the present invention be cylindrical in shape. Cylindrical is not meant to be limited to tubular-type shapes which are open on both ends, but instead may include a number of shapes with a variety of openings or methods of attachment. For example, such a cylindrical structure may be open on one end, or a side, for direct attachment to a fluid-containing tank, the end of a piping system or the like.

Figure 1:
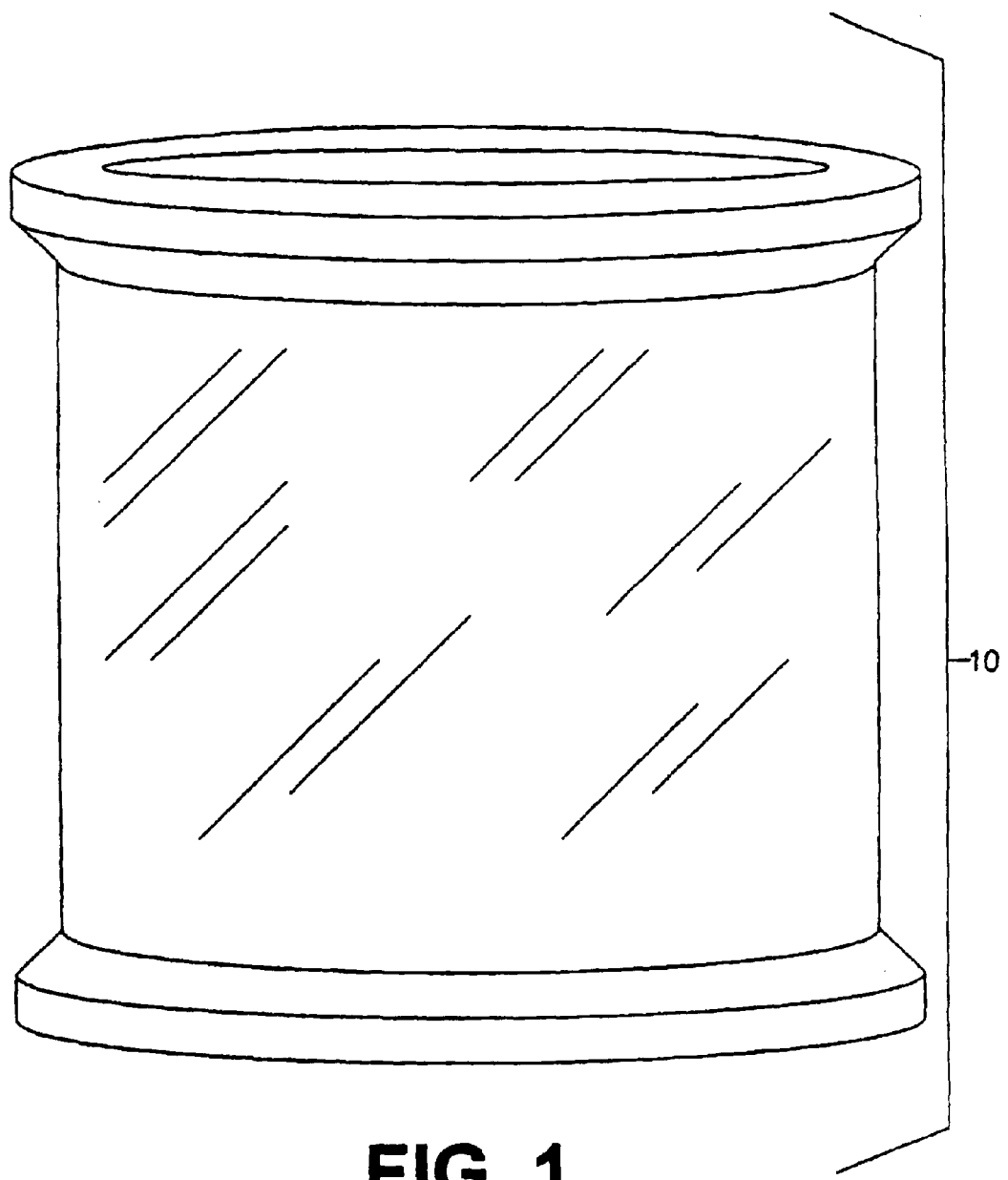
FIG. 1 depicts a cylindrical sight bowl made with an epoxy compound in accordance with the present invention.
Figure 2:
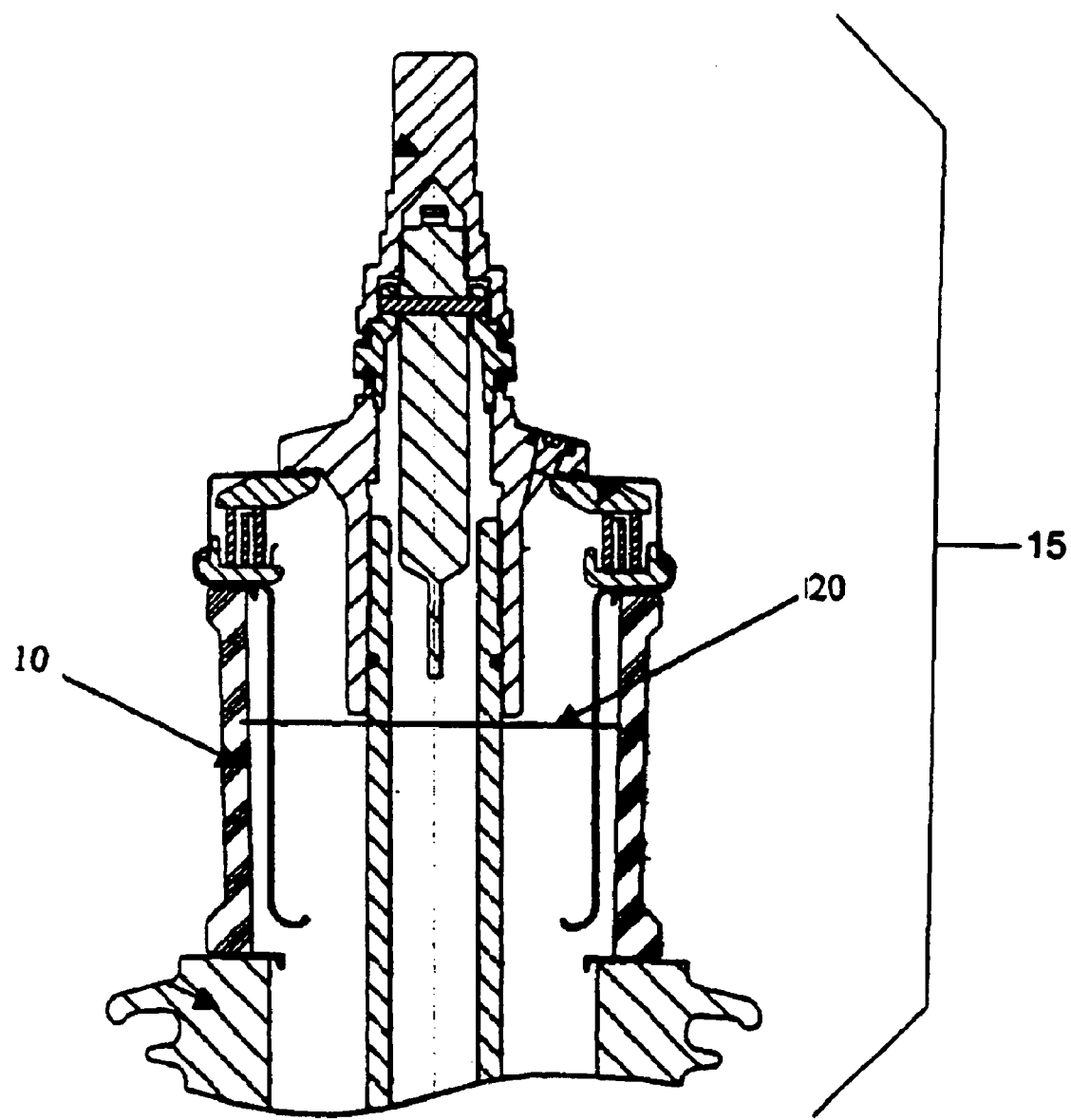
FIG. 2 depicts the cross section of a high voltage bushing of a utility or industrial transformer incorporating a cylindrical sight bowl made with an epoxy compound in accordance with the present invention.

In a further preferred embodiment of the present invention the cylindrical structure is shaped as a sight bowl 10 as shown in FIG. 1. It is further preferred that such a sight bowl 10 be utilized in a high voltage bushing 15 for use in a utility or industrial transformer as shown in FIG. 2. Use in accordance with this aspect of the invention can remedy the problem of the limited availability of large glass sight bowls currently utilized in high voltage bushings. The sight bowls 10 of the present invention preform the identical tasks of glass sight bowls in that they allow the insulating fluid level 20 inside the tank to be monitored, while also providing long lasting structural support in the high voltage bushing 15.

It is further preferred that the cured epoxy compound used in the present invention be a cycloaliphatic epoxy resin. Cycloaliphatic epoxy resins are currently known for having somewhat stable and strong properties especially when used in conjunction with fillers. Filler-less cycloaliphatic epoxy resins, on the other hand, are such that when cured into a final product, they may be transparent. Such transparency will not in all cases be a clear transparency, i.e., the transparency of a standard window, but instead may have a colored tint such as yellow. While a tint may be present, the structure is still transparent in that the presence and level of liquids, for example, may be seen through the wall of the structure.
}

It is further preferred that the rigid, three-dimensional, transparent structure disclosed herein be anhydride cured. Anhydride is well known in the art as a hardener which upon introduction during the manufacturing stage increases the overall strength of the final product.

It is further preferred that the embodiment also contain ultraviolet light absorbers. When used in the outside environment, for example, the transparent epoxy structure may house light-sensitive materials such as dielectric oil when used in a utility or industrial transformer. As such, the oil can be harmed by continued exposure to ultraviolet rays. Ultraviolet light absorbers remedy this problem when introduced into the epoxy compound at the manufacturing stage.

Figure 3A:
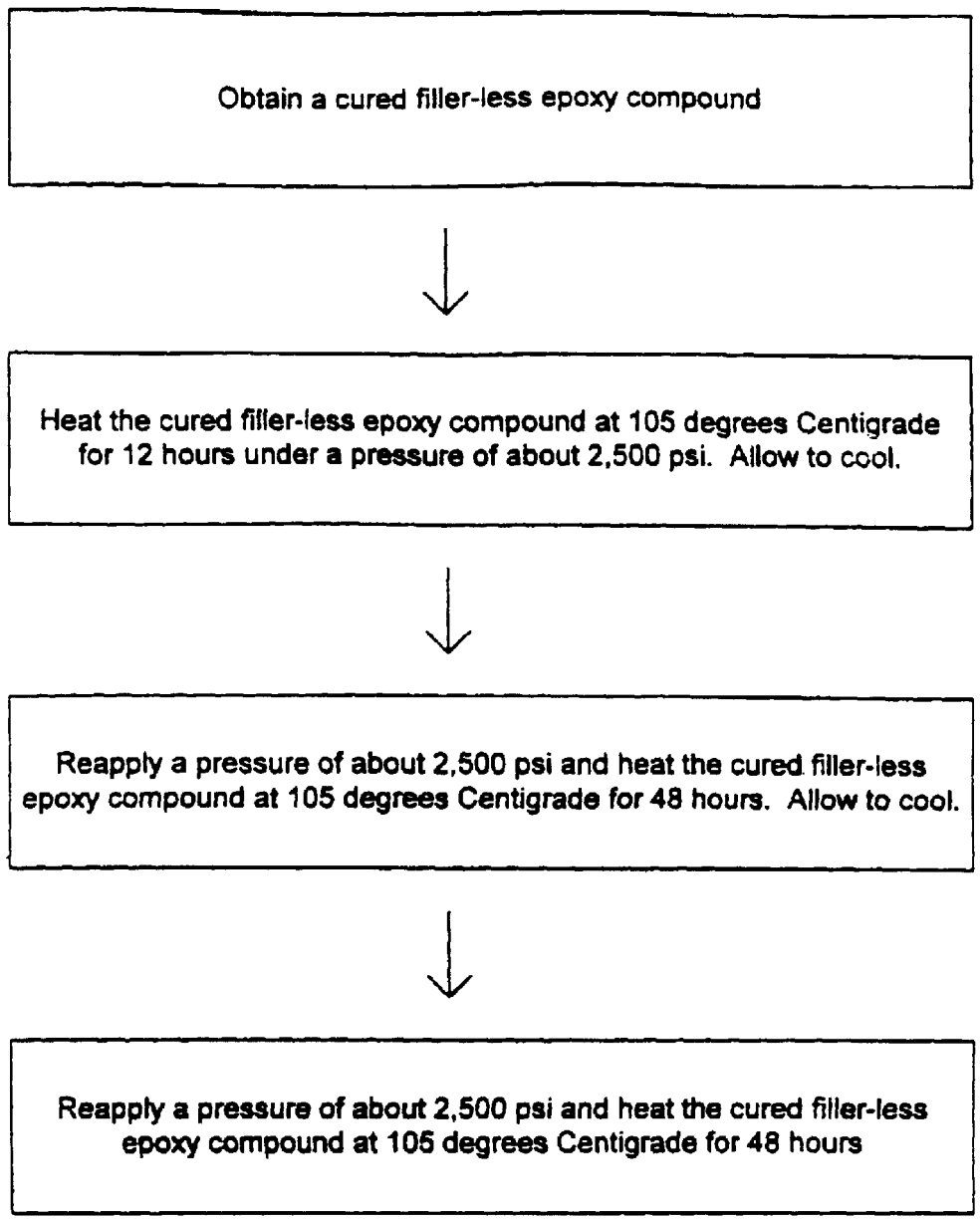
FIGS. 3a and 3b set forth two of the possible methods for preparing a structure in accordance with the present invention.
Figure 3B:

A method of making a rigid, three-dimensional, transparent cured epoxy structure described above is also set forth in this invention, examples of which are set forth in FIGS. 3a and 3b. The preferred method set forth in this invention includes two steps of manufacturing process as described below. The first step of such a method involves obtaining a cured filler-less epoxy compound and the second step involves pre-stressing the epoxy compound.

Epoxy compounds are generally available from a number of chemical manufacturers. Certain manufacturers may be willing to mold an epoxy compound into the customer's requested shape and dimensions. Currently it is not possible to obtain a transparent epoxy compound that is suitable for use under extreme heat and pressure conditions, such as those present in a working high voltage bushing. The primary reason for this is because epoxy compounds obtain their physical strength and rigidity from the introduction of fillers into the compound prior to cure, and as previously mentioned, the introduction of fillers may create a non-transparent compound.

Accordingly, a preferred starting material for the method set forth in this invention is a cured filler-less epoxy compound that is transparent. The compound will have been produced without the introduction of fillers as described above. The manufacturer preferably will have molded the compound into the desired shape and size and subsequently cured the compound into a solid product. Curing typically entails applying heat to the structure. Ideally, an epoxy product coming from a chemical manufacturer would be one hundred percent cured, but this is usually not the case. It is common to receive a molded epoxy product from a manufacturer that is solid in form, but not entirely cured. In such a case, the epoxy resin may be, for example, ninety-eight percent cured. In such a case, additional curing may be necessary in order to get closer to a one hundred percent cured product. This involves applying additional heat to the product over what was applied during the initial manufacturing stage. This additional curing step ensures that all epoxy products are predictably cured to a very high level and therefore suitable for pre-stressing as set forth below. A further preferred method of the present invention involves obtaining a cured epoxy product by applying additional heat to a molded filler-less epoxy compound at a temperature of 150°°C. for an additional twelve hours.

The curing step set forth above is not meant to limit the present invention to separate manufacturing steps or locations. It is possible with the present invention, if desired, to combine all method steps into one manufacturing process. In other words, a current manufacturer of epoxy products could possibly introduce these method steps into its procedures and come up with a final product consistent with the scope of this invention. It is also possible to completely cure an epoxy product in the first instance so that a second curing step is no longer necessitated. The preferred method requires a highly cured starting compound, whether it takes one curing process or numerous ones.

It is preferred that the cured filler-less epoxy compound be a filler-less cycloaliphatic epoxy resin and further preferred that it be anhydride cured. As previously mentioned, cycloaliphatic resins are currently known for having somewhat stable and strong characteristics and filler-less cycloaliphatic epoxy resins can produce a transparent final product. It is further preferred that the cured filler-less epoxy compound also contain ultraviolet light absorbers.

A further aspect of this invention entails pre-stressing the structure. Pre-stressing may involve simultaneously placing the structure under heat and pressure. Pre-stressing is meant to expose the structure to exaggerated elements and conditions that will be faced during continued use. For example, an epoxy sight bowl 10 that is to be used in a utility or industrial high voltage bushing will be placed under high heat and high pressure conditions. Such conditions will produce a final product that is more structurally sound than the original cured starting material. The requisite pressure for this aspect of this invention may be applied in a number of ways with the presently preferred method being the application of a clamp to the structure. It is the preferred method of the present invention that the applies heat in the pre-stressing step be above 105° C., with variations in pressure and time according to the intended use of the product and its size.

The method of the present invention is explained in further detail by means of the following illustrative examples which are not meant to limit the scope of the invention as set forth in the claims.

EXAMPLE 1

One embodiment of the present invention was prepared by first obtaining a cured epoxy component from CompTec Inc., Irwin, Pa. This component was requested to be manufactured by CompTec into a shape and size sufficiently similar to glass sight bowls currently used in utility and industrial high voltage bushings. Ultraviolet light absorbers were also requested to be included in the epoxy compound to be used by CompTec. The epoxy sight bowl was molded by CompTec using a cycloaliphatic anhydride cured epoxy resin, referred to by CompTec as Product No. C5125U. After obtaining the epoxy sight bowl, it was then cured at 150° C. for an additional 12 hours. The component was then pre-stressed for 48 hours at 105° C. under a pressure of about 2,500 pounds per square inch ("psi") which was provided by a clamping mechanism. The component was subsequently cooled. The pre-stressing procedure was then repeated for another 48 hours at 105° C. under a pressure of about 2,500 psi. The component was subsequently cooled. The pre-stressing procedure was then repeated for a third time for another 48 hours at 105° C. under a pressure of about 2,500 psi. The epoxy sight bowl was then tested and determined to be suitable for use in utility or industrial high voltage bushings in place of currently used glass sight bowls based on its improved rigidity and continued transparency.

EXAMPLE 2

Another embodiment of the present invention was prepared by first obtaining the same cured epoxy sight bowl from CompTec Inc., Irwin, Pa. as described above in EXAMPLE 1. After obtaining the molded epoxy sight bowl, it was then cured at 150° C. for an additional 12 hours. The component was then pre-stressed for 12 hours at 125° C.

under a pressure of about 2,500 psi which was provided by a clamping mechanism. The epoxy sight bowl was then tested and determined to be suitable for use in utility or industrial high voltage bushings in place of currently used glass sight bowls based on its improved rigidity and continued transparency.

The scope of protection of the following claims is not intended to be limited to the presently preferred embodiments described above. For example, the inventive methods disclosed herein may be employed to increase the temperature at which the pre-stressing step occurs, while simultaneously decreasing the length of time for the pre-stressing step. Another example may be to decrease the pressure during the pre-stressing step, while simultaneously increasing the length of time. Those skilled in the art will readily appreciate that many modifications can be made to the preferred embodiments described herein.

What is claimed is:

1. A power transformer, comprising:
   a transformer tank;
   a bushing coupled to said transformer tank; and
   a sight bowl housed in said bushing, said sight bowl being transparent and comprising a cured epoxy compound.

2. The power transformer of claim 1 wherein said sight bowl is cylindrical.

3. The power transformer of claim 1 wherein said cured epoxy compound comprises a cycloaliphatic epoxy compound.

4. The power transformer of claim 3 wherein said cured epoxy compound is anhydride cured.

5. The power transformer of claim 4 wherein said cured epoxy compound contains ultraviolet light absorbers.

6. A bushing for a power transformer, comprising a sight bowl housed in said bushing, said sight bowl being transparent and comprising a cured epoxy compound.

7. The bushing of claim 6 wherein said sight bowl is cylindrical.

8. The bushing of claim 6 wherein said cured and filler-less epoxy compound comprises a cycloaliphatic epoxy compound.

9. The bushing of claim 8 wherein said cured and filler-less epoxy compound is anhydride cured.

10. The bushing of claim 9 wherein said cured and filler-less epoxy compound contains ultraviolet light absorbers.

* * * * *

UNITED STATES PATENT AND TRADEMARK OFFICE
CERTIFICATE OF CORRECTION

PATENT NO. : 6,924,438 B2
DATED : August 2, 2005
INVENTOR(S) : David M. Geibel

It is certified that error appears in the above-identified patent and that said Letters Patent is hereby corrected as shown below:

Column 6,
Lines 15, 16, 18, 19, 20 and 21, after "cured" delete "and filler-less".

Signed and Sealed this

Fourth Day of October, 2005

JON W. DUDAS
*Director of the United States Patent and Trademark Office*